3,239,997
STATIONARY LIQUID PHASE FOR GAS
CHROMATOGRAPHY
Walter R. Supina, State College, Pa., assignor to Applied
Science Laboratories, Inc., State College, Pa.
No Drawing. Filed Dec. 4, 1962, Ser. No. 243,194
18 Claims. (Cl. 55—67)

This invention relates to a stationary phase for use in gas-liquid chromatography.

Many materials have been used as the stationary phase in gas-liquid partition chromatography columns for the separation of steroids and other relatively high boiling compounds but all of these are either too volatile or too limited in thermal stability, or are characterized by too low a degree of polarity, to be satisfactory. Thus, a low polarity of the stationary phase limits to a considerable extent the degree of separation between components in a mixture being analyzed. Inadequate thermal stability results in decomposition and/or vaporization and a short period of usefulness for the chromatography column. Even during this short period of use, the decomposition products of the coating result in a relatively great noise level in the electronic detecting apparatus used so that recorder tracings are distorted and interpretation is difficult or impossible. A stationary phase to be useful in this type of system must be stable and of low volatility under the relatively high operating temperature of the column, and must be selective in its retention of certain components of the mixture being analyzed. The stationary phase must also be capable of uniform distribution upon its finely divided solid support. It is with respect to an improved stationary phase that this invention relates.

It is an important object of this invention to provide a thermally stable and non-volatile column packing, useful at 250° C., and consisting of a stationary phase coated on an inert support, for use in separation and analysis of complex mixtures of high boiling compounds such as steroids and lipids. It is a further object of the invention to provide a gas-liquid partition column packed with a thermally stable and non-volatile stationary phase supported on an inert material. It is also an object of the invention to provide a stationary phase which is sufficiently polar to cause separation of steroids and other high boiling compounds such as bile acid ester. It is also an objective to produce a stationary phase which is sufficiently high boiling and non-volatile so as not to be eluted from the column. An additional object of the invention is to provide such a stationary phase having properties such that samples dissolved therein can be eluted from it easily to obtain sharp elution peaks with good symmetry.

According to my invention, for a stationary phase I employ a polyester made from cyclohexanedimethanol and a dibasic acid the structural formula for cyclohexanedimethanol being

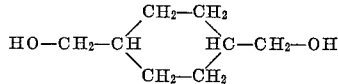

and the resulting formula for the resulting polyester being

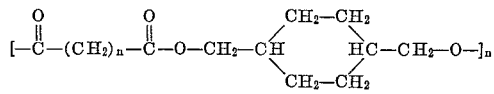

A wide variety of dibasic acids, including adipic, sebacic and succinic may be used, and consequently polyesters of various degrees of polarity may be prepared. As an example, a polyester was prepared from 31.5 moles cyclohexanedimethanol and 30 moles succinic acid. These materials were heated under an atmosphere of nitrogen at 150° C. for approximately 3 hours, and at 220° C. for 2 hours. The system was then evacuated to a total pressure of 15 mm. Hg and heated at 220° C. for an additional 2 hours. The resulting polymer was then cooled.

A column packing consisting of 4% of the above polyester deposited on 100/120 mesh GAS-CHROM P solid support was prepared, and packed into a 6 foot long, 4 mm. I.D. column. Operating conditions were: column temperature 250° C., inlet pressure 25 p.s.i.g., flow rate 55 ml./min. The following typical analytical results were obtained with a mixture containing the compounds listed.

| Sample | Retention Time (minutes) | Retention Time Relative to Androstane |
|---|---|---|
| Androstane | 2.5 | 1.0 |
| Androstan-3-one | 9.4 | 4.64 |
| Cholestane | 15.7 | 7.95 |
| Androstan-3,17-dione | 55.4 | 27.85 |
| 4-androsten-3,17-dione | 83.7 | 43.8 |

A chromatographic analysis was performed using mixtures containing like quantities of bile acid esters. Results similar to those in the table were obtained.

Similar results were obtained repeatedly with this and other columns made in a similar manner, and with up to 15% stationary phase on the support. There was a very low noise level in the electronic recording system and components present in small proportion could be readily detected and estimated.

These data make it apparent that the polyester described can be used effectively at temperatures up to 250° C. for chromatographic analyses.

From the above it will apparent that I have attained the objects of my invention and have provided a stationary phase for a gas chromatographic column packing which is thermally stable to temperatures up to 250° C. and which has a degree of polarity sufficient to be useful for analysis of mixtures of steroids and other high boiling compounds such as lipids.

The invention has been described with reference to preferred embodiments but it is to be understood that these are by way of illustration only. Accordingly, it is contemplated that modifications and variations can be made in proportions, temperature, length of heating time and other conditions in preparation and use of the polyester without departing from the basic idea of the invention. Modifications can also be made in the proportion of the phase on the support, in the material of the support and in the conditions of use and the substance analyzed.

What I claim is:

1. In the chromatographic analysis of difficultly separated mixtures of high boiling materials, the method which comprises passing such a mixture combined with carrier gas through an elongated mass of supporting material, having thereon a stationary phase consisting of a polyester prepared from cyclohexanedimethanol and a dibasic acid.

2. The method of claim 1 wherein the dibasic acid is adipic acid.

3. The method of claim 2 wherein said stationary phase is thermally stable at temperatures up to 250° C.

4. The method of claim 1 wherein the dibasic acid is sebacic acid.

5. The method of claim 4 wherein said stationary phase is thermally stable at temperatures up to 250° C.

6. The method of claim 1 wherein the dibasic acid is succinic acid.

7. The method of claim 6 wherein said stationary phase is thermally stable at temperatures up to 250° C.

8. A column packing for conducting gas chromatographic analysis, said column packing consisting of a solid support coated with a polyester prepared from cyclohexanedimethanol and a dibasic acid.

9. The apparatus of claim 8 wherein said stationary phase is thermally stable at temperatures up to 250° C.

10. The column packing of claim 8 wherein the dibasic acid is adipic acid.

11. The apparatus of claim 10 wherein said stationary phase is thermally stable at temperatures up to 250° C.

12. The column packing of claim 8 wherein the dibasic acid is sebacic acid.

13. The apparatus of claim 12 wherein said stationary phase is thermally stable at temperatures up to 250° C.

14. The column packing of claim 8 wherein the dibasic acid is succinic acid.

15. The apparatus of claim 14 wherein said stationary phase is thermally stable at temperatures up to 250° C.

16. The method of claim 1 wherein said mixtures contain steroids.

17. The method of claim 1 wherein said mixtures contain bile acid esters.

18. The method of claim 1 wherein said stationary phase is thermally stable at temperatures up to 250° C.

References Cited by the Examiner

Haahti, E. O. A.; Van den Heuvel, W. J. A.; and Horning, E. C.: Gas Chromatographic Separations of Steroids with Polyester Phases. In J. Org. Chem. 26; pages 626–627 (1961).

James, A. T.: The Separation of the Long Chain Fatty Acids by Gas-Liquid Chromatography. In Am. J. Clinical Nutrition 6 (6), pages 595–600 (1958).

REUBEN FRIEDMAN, *Primary Examiner.*